May 30, 1950  P. C. VAN DER WILLIGEN ET AL  2,509,999
ARTICLE FOR ELECTRIC ARC WELDING ONE
METALLIC WORKPIECE TO ANOTHER
Filed March 9, 1948
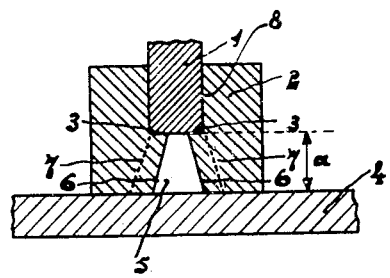
Paul Christiaan van der Willigen
and Simon Dirk Boon
INVENTORS
BY Fred M. Vogel
AGENT Patented May 30, 1950

2,509,999

UNITED STATES PATENT OFFICE 2,509,999

ARTICLE FOR ELECTRIC ARC WELDING ONE METALLIC WORKPIECE TO ANOTHER

Paul Christiaan van der Willigen and Simon Dirk Boon, Eindhoven, Netherlands, assignors to Hartford National Bank and Trust Company, Hartford, Conn., as trustee Application March 9, 1948, Serial No. 13,914
In the Netherlands March 11, 1947

2 Claims. (Cl. 219—10)

This invention relates to methods of electric arc-welding in which no use is made of bare welding wire or coated welding rods, but an arc is produced directly between the work-pieces to be joined owing to the use of a semi-conductive, slag-forming solid body which has sufficient conductivity for the initiation of the arc and which brings about conductive contact between the work-pieces to be joined, which are originally spaced a certain distance apart. In this method the arc is only of very short duration and care is taken to ensure that the one work-piece, in most cases a rod-like body, such as a bolt, is placed on the other workpiece at a desired moment. This is accomplished by a suitable choice of the shape and dimensions of the semi-conductive slag-forming solid body so that a more or less complicated regulating device is not required.

According to the invention, the semi-conductive slag-forming body has a cavity in which one of the work-pieces to be welded, and more particularly a rod-like work-piece such as a bolt, is placed at a distance, determined by the said cavity, from the other work-piece. A recess is also provided in the slag-forming solid body adjacent the other work-piece to serve as a space for the arc.

The above-described hollow slag-forming solid body according to the invention permits the said very short duration (0.5–2 seconds) of the arc to be controlled at will. In applicants' copending application Serial No. 13,915, filed March 9, 1948, for a Method and article for electric arc-welding one metallic work-piece to another, a unitary bolt and semi-conductive slag-forming body is described and claimed.

In order that the invention may be more clearly understood and readily carried into effect, it will now be described more fully by reference to the single figure in the accompanying drawing.

An iron bolt I is placed in the cavity 8 of the semi-conductive slag-forming solid body 2 and rests on a ledge 3, provided at the desired distance a from the metallic work-piece 4. The slag-forming solid body 2 has also a cavity 5 which communicates with cavity 8 and, which serves to receive the arc produced between the work-pieces I and 4; said communicating cavities together forming a passageway through said body 2. Soon after this welding arc has been produced, fusion of the wall 6 of the slag-forming body occurs so that ledges 3 disappear and a larger space is formed which is substantially bounded by a wall 7 shown in dotted lines in the drawing. The iron bolt I is adapted to be moved into and through said larger space by means which, for example, may be the action of spring pressure (not shown) towards the work-piece 4.

The conductivity of the semi-conductive slag-forming solid body according to the invention required for the initiation of the welding arc may be obtained by mixing a large quantity of metal powder with constituents such as used in slag-forming coatings of welding rods.

A strong junction is obtained more particularly if, during the welding process, the slag-forming solid body cannot develop any gas which might have a disturbing effect upon the formation of a fusion pole at the welding spot. For this reason use is preferably made of a slag-forming solid body which has undergone a preheating process so that the gases concerned have already escaped. In order to avoid oxidation of determined constituents such as, for example, of ferromanganese, the preheating process is preferably carried out in non-oxidising surroundings.

As an example of a composition of the slag-forming solid body which is very suitable for use in the invention, we may mention a mixture consisting of 15% by weight of calcium carbonate, 13% by weight of calcium fluoride, 12% by weight of bentonite, 2% by weight of ferromanganese, 3% by weight of ferro-silicium, 2% by weight of ferro-titanium, and 53% by weight of powdery iron. The slag-forming solid bodies obtained therefrom are heated in vacuo for one hour at 800° C. prior to use in a welding operation.

What we claim is:

1. An article for use in electric arc-welding one metallic work-piece to another metallic work-piece comprising a semi-conductive slag-forming solid body having a planar surface adapted to abut one of the work-pieces to be welded and another surface substantially opposite said planar surface, said solid body having a passageway completely therethrough and opening out in both said planar surface and said another surface, the portion of said passageway adjacent said another surface having a diameter adapted to receive the other of the work-pieces inserted therein, and a restricting ledge in said passageway adapted to limit the degree of insertion of the other work-piece.

2. An article for use in electric arc-welding one metallic work-piece to another metallic work-piece as claimed in claim 1, characterized in that said semi-conductive slag-forming solid body comprises powder.

PAUL CHRISTIAAN VAN DER WILLIGEN.
SIMON DIRK BOON.

REFERENCES CITED

The following references are of record in the file of this patent:

UNITED STATES PATENTS

| Number | Name | Date |
|---|---|---|
| Re. 22,108 | Crecca | June 9, 1942 |
| 2,043,960 | Jones et al. | June 9, 1936 |
| 2,326,865 | Kennedy | Aug. 17, 1943 |
| 2,370,100 | White | Feb. 20, 1945 |
| 2,429,175 | Van der Willigen et al. | Oct. 14, 1947 |
| 2,459,957 | Palmer | Jan. 25, 1949 |
| 2,474,531 | Keir et al. | June 28, 1949 |

FOREIGN PATENTS

| Number | Country | Date |
|---|---|---|
| 497,133 | Great Britain | Dec. 13, 1938 |
| 365,302 | Italy | Nov. 30, 1938 |

Certificate of Correction

Patent No. 2,509,999                                                           May 30, 1950

PAUL CHRISTIAAN VAN DER WILLIGEN ET AL.

It is hereby certified that error appears in the printed specification of the above numbered patent requiring correction as follows:

Column 3, line 8, after the word "comprises" insert *metal*;

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*